(12) United States Patent
Rousselle, Sr. et al.

(10) Patent No.: US 11,361,271 B2
(45) Date of Patent: Jun. 14, 2022

(54) METHOD OF TRANSMITTING ELECTRICITY

(71) Applicant: ALTERNATIVE TRANSMISSION INC., Doylestown, PA (US)

(72) Inventors: Adam R. Rousselle, Sr., Doylestown, PA (US); Steven Weber, Madison, WI (US); Jeffrey Dana Watkiss, Washington, DC (US)

(73) Assignee: ALTERNATIVE TRANSMISSION INC., Sullivans Island, SC (US)

( * ) Notice: Subject to any disclaimer, the term of this patent is extended or adjusted under 35 U.S.C. 154(b) by 450 days.

(21) Appl. No.: 16/376,341

(22) Filed: Apr. 5, 2019

(65) Prior Publication Data
US 2019/0312296 A1 Oct. 10, 2019

Related U.S. Application Data

(60) Provisional application No. 62/678,771, filed on May 31, 2018, provisional application No. 62/653,707, filed on Apr. 6, 2018.

(51) Int. Cl.
*H02J 3/28* (2006.01)
*H01M 8/04858* (2016.01)
(Continued)

(52) U.S. Cl.
CPC ............. *G06Q 10/083* (2013.01); *B61D 5/00* (2013.01); *B65G 65/02* (2013.01); *G06Q 10/08* (2013.01);
(Continued)

(58) Field of Classification Search
CPC ... G06Q 10/083; G06Q 10/08; H02J 7/00045; H02J 3/28; B61D 5/00; B65G 65/02;
(Continued)

(56) References Cited

U.S. PATENT DOCUMENTS 9,550,582 B2 1/2017 Wang
9,550,659 B2 1/2017 Nakazawa et al.
(Continued)

FOREIGN PATENT DOCUMENTS

WO 2010042659 A1 4/2010
WO 2015029941 A1 3/2015
WO WO-2021099661 A * 5/2021 .............. B60L 53/00

OTHER PUBLICATIONS

"Fast Charge/Discharge of Li Metal Batteries Using an Ionic Liquid Electrolyte" Published by Journal of the electromechanical Society (Year: 2013).*
(Continued)

*Primary Examiner* — Zeina Elchanti
(74) *Attorney, Agent, or Firm* — McNees Wallace & Nurick

(57) ABSTRACT

A method of transmitting electricity including providing a shippable container configured to transport a liquid electrolyte solution to a first charging station. The first charging station is configured to apply electricity to the liquid electrolyte solution. The first charging station charges the liquid electrolyte solution by applying electricity to the liquid electrolyte solution. The charged liquid electrolyte solution is loaded into the shippable container and transported to a discharging station. The electrolyte solution is electrically discharged at the discharging station and subsequently transported to a second charging station.

30 Claims, 10 Drawing Sheets

(51) Int. Cl.
  *H01M 8/18* (2006.01)
  *B65G 65/02* (2006.01)
  *H02J 7/00* (2006.01)
  *B61D 5/00* (2006.01)
  *G06Q 10/08* (2012.01)

(52) U.S. Cl.
  CPC ....... *H01M 8/04925* (2013.01); *H01M 8/188* (2013.01); *H02J 3/28* (2013.01); *H02J 7/00045* (2020.01); *H01M 2250/10* (2013.01); *H01M 2250/20* (2013.01)

(58) Field of Classification Search
  CPC ............. H01M 8/04925; H01M 8/188; H01M 2250/10; H01M 2250/20
  USPC ......................................................... 705/330
  See application file for complete search history.

(56) References Cited

U.S. PATENT DOCUMENTS

| | | | |
|---|---|---|---|
| 9,960,698 | B2 | 5/2018 | Nagashima et al. |
| 2008/0291033 | A1* | 11/2008 | Aghassipour .......... G06Q 50/30 340/584 |
| 2009/0134717 | A1 | 5/2009 | Marks |
| 2010/0063887 | A1* | 3/2010 | Kranz .................... G06Q 99/00 705/17 |
| 2010/0115673 | A1 | 5/2010 | Kranz et al. |
| 2013/0245991 | A1* | 9/2013 | Kriss ...................... G06Q 50/28 702/150 |
| 2015/0227886 | A1* | 8/2015 | Peters ................ G06Q 10/0832 705/332 |

OTHER PUBLICATIONS

Chalamala, Babu R., et al. "Redox Flow Batteries: An Engineering Perspective" Proceedings of the IEEE, IEEE, New York, US, vol. 102, No. 6, Jun. 1, 2014, pp. 976-999.

Feng Pan and Qing Wang, Redox Species of Redox Flow Batteries: A Review, MDPI Journal/Molecules; 2015, vol. 20, pp. 20499-20517; doe: 10.3390; Basel, Switzerland.

Stewart Paterson; Liquid battery could charge electric cars in seconds; Energy Central/Evening Times; Aug. 15, 2018; www.energycentral.com/news/liquid-battery-could-charg-electric-cars-seconds? access Jun. 7, 2019.

* cited by examiner

METHOD OF TRANSMITTING ELECTRICITY

RELATED APPLICATIONS

This application claims the benefit of, and priority to, U.S. App. No. 62/653,707, filed Apr. 6, 2018, and U.S. App. No. 62/678,771, filed May 31, 2018, which are hereby incorporated by reference in their entirety.

FIELD

The present application is generally directed to a method for transmitting electricity.

BACKGROUND

During the dispatch of the bulk electrical grid, congestion prevents the delivery of low cost electricity from certain electricity generators to certain electrical load zones because the electrical transmission circuits that connect the generator to the load have reached their maximum capabilities. New transmission circuits needed to connect the generators to the load zones can take years to build and often the land needed for rights-of-way is not available.

Building the current wire-based electrical transmission infrastructure faces massive competition for surface rights-of-way, takes years to build and requires hundreds of millions of dollars.

SUMMARY

In an embodiment, a method of transmitting electricity includes providing a first charging station at a first location configured to transfer electrical charge to a mobile medium capable of carrying and maintaining electrical charge or electricity until the medium is discharged into the grid. The method also includes receiving, by the mobile medium, electrical charge from the first charging station, transporting the charged mobile medium to a second location and discharging the charged mobile medium such that electrons therein are transported from the first location to the second location without a wired transmission network. In a presently preferred embodiment, the mobile medium contains more than 33 kV of electric potential and is transported contemporaneously by one or more mobile storage units across state lines before discharge from the mobile medium at the second location.

In an embodiment, a method of transmitting electricity includes providing a shippable container configured to transport a liquid electrolyte solution to a first charging station. The first charging station is configured to apply electricity to the liquid electrolyte solution. The method additionally includes charging the liquid electrolyte solution by applying electricity from the first charging station and loading the charged liquid electrolyte solution into the shippable container. Alternatively, the liquid electrolyte may be charged while in the shippable container. The method also includes transporting the shippable container containing the charged liquid electrolyte solution to a discharging station and discharging the charged liquid electrolyte solution. In some embodiments, the shippable container is transported across state lines. The method further includes transporting the shippable container containing the discharged liquid electrolyte solution to a second charging station.

In an embodiment, a method of transmitting electricity includes providing a first charging station at a first location configured to transfer electrical energy to a mobile discharging station which includes a medium capable of carrying and maintaining electrical energy until the medium discharges electricity into the grid from the discharging station. The method also includes receiving by the mobile discharging station electrical energy from the first charging station, transporting the discharging station to a second location and discharging the electricity such that the electricity is transported from the first location to the second location without a wired transmission network. In a presently preferred embodiment, the discharging station is able to discharge at least 0.1 megawatt hour of power. The mobile medium contains electrical energy of more than 3.6 Megajoules and is transported contemporaneously by one or more mobile units across state lines before discharge from the mobile medium at the second location. In another presently preferred embodiment, the discharging station discharges the electricity into an electrical grid.

In an embodiment, a method of transmitting electricity includes providing a shippable discharging station container configured to transport an electrolyte solution to a first charging station. The first charging station is configured to charge electrical energy into the electrolyte solution. The method additionally includes charging the electrolyte solution by applying electrical energy from the first charging station and loading the charged electrolyte solution into the shippable discharging station. Alternatively, the electrolyte may be charged while in the shippable discharging station. The method also includes transporting the shippable discharging station and discharging the electrical energy. In some embodiments, the shippable discharging station is transported across state lines. The method further includes transporting the shippable discharging station containing the discharged electrolyte solution to a second charging station.

An advantage of exemplary embodiments is that it transfers electric energy across state lines from one location to another having a load zone in need of that electric energy and, as a result, qualifies as transmission of electricity instead of storage in the context of current U.S. regulatory requirements, yet that transmission from the first to the second location is accomplished without the use of the traditional wired network.

That is, by executing the process steps described herein, transportation of electric energy by mobile containers from a charging station to an electrical substation adjacent a discharging station and discharging the electricity at the desired load zone, exemplary embodiments transform what is commonly known as "storage" into what the electrical industry and U.S. governmental regulations define as "transmission of electric energy in interstate commerce."

Other features and advantages of the present invention will be apparent from the following more detailed description, taken in conjunction with the accompanying drawings that illustrate, by way of example, the principles of the invention.

DETAILED DESCRIPTION

Provided is a method of transmitting electrical energy. Embodiments of the present disclosure, for example, in comparison to concepts failing to include one or more of the features disclosed herein, result in the storage, transportation, and transmission of electrical energy.

Transmitting electricity over great distances historically has required transmission wires that physically interconnected generators to load zones. Electrolyte solution historically has been used as a battery or storage device where the charging and discharging occurs at a fixed location.

In an embodiment, a liquid electrolyte solution is charged (e.g., oxidized or reduced) to store electrical energy. The liquid electrolyte solution can then be transported using a transportation system (e.g., car, truck, rail, ship, and/or air) to deliver the charged liquid electrolyte solution to a remote location where and when needed. In one embodiment, the charged liquid electrolyte solution is transported by rail.

While described herein primarily with respect to liquid electrolyte solution, the invention is not so limited. It will be appreciated that any means for bulk transfer of electrons in a container from one location to another without the use of a wired network and that can be charged at the first location and later discharged into a load zone at or accessible from a second location may be employed, including for example, and without limitation, lithium ion cells and the like.

The energy stored in the charged liquid electrolyte solution may be discharged as needed. In some embodiments, the liquid electrolyte solution may be charged at a first location and discharged at a second, different location. In an embodiment, the discharging may be performed at a location not served by an electrical grid. In another embodiment, the discharging may be performed at a location to augment an existing electrical grid. In a further embodiment, the discharging may be configured to provide power in excess of the capacity of an existing electrical grid.

Figure 1:
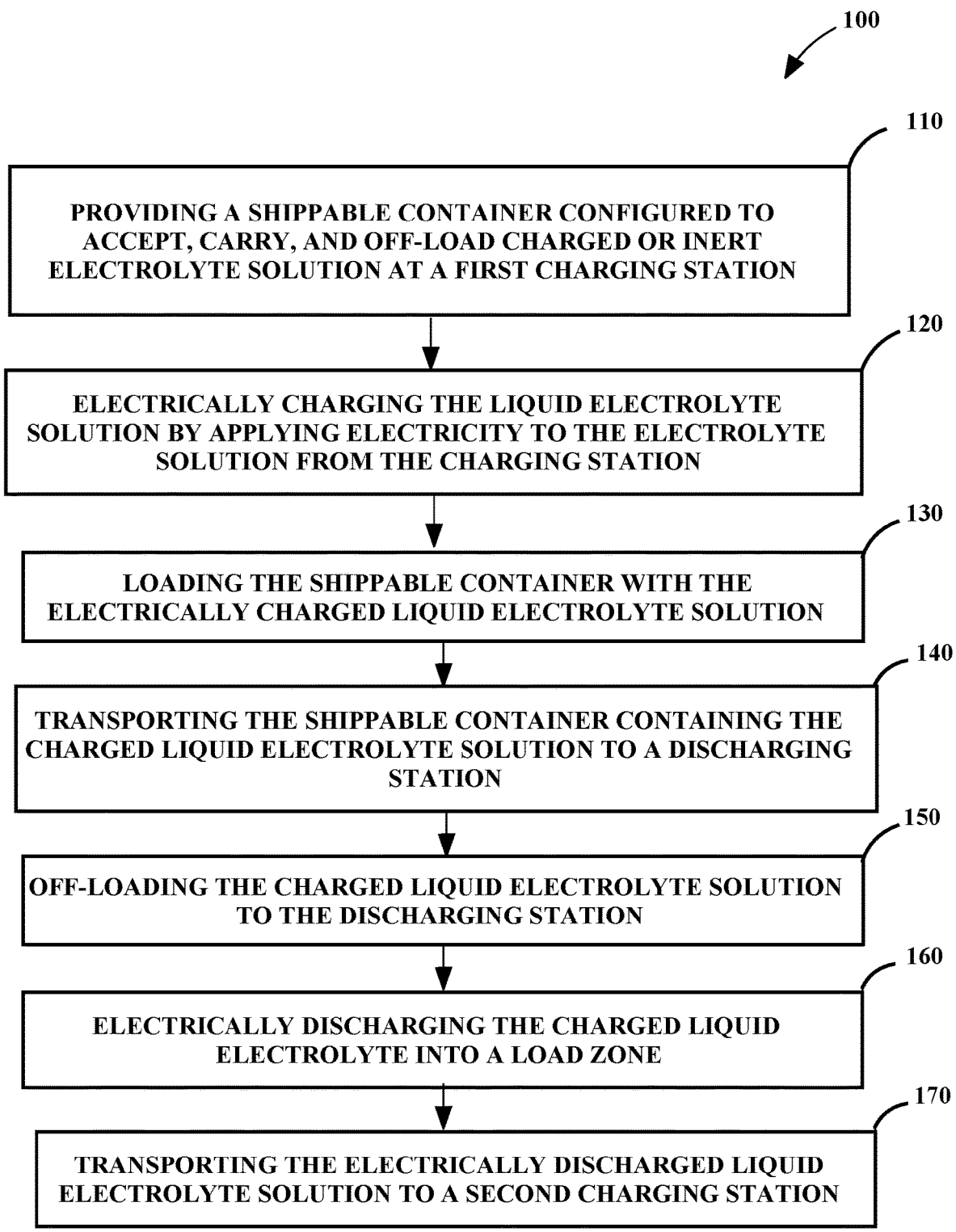
FIG. 1 is a flowchart of a method of transmitting electricity, according to an embodiment.

An embodiment of a method 100 of transmitting electricity is shown in FIG. 1. In the example of FIG. 1, at block 110, a shippable container configured to accept, carry and off-load charged and/or inert electrolyte solution is provided at a first charging station. In some embodiments, the shippable container may include a railroad tank car, tanker truck, tanker trailer, ocean going tanker, or sealable shipping container. In one embodiment, the shippable container is configured to be shippable by railroad. In one embodiment, the shippable container is a railroad tank car configured to transport the liquid electrolyte solution. In some embodiments, the first charging station includes an electrical substation. In some embodiments, the first charging station includes an electrical generating station. In some embodiments, the electrical generating station generates at least a portion of the station output from solar and/or wind energy. In some embodiments, the first charging station includes a railroad spur.

At block 120, the liquid electrolyte solution is charged by applying electricity to the liquid electrolyte solution from the charging station (e.g., electrical substation). The number of shippable containers and the amount of the liquid electrolyte solution may be selected to provide a predetermined amount of electrical power to a discharging station (e.g., electrical substation, remote job site). In some presently preferred embodiments, the amount of electric potential transported for discharge into a load zone remote from the first location is greater than 33 kV. In some cases, that may require contemporaneous transportation of multiple containers of the charged electrolyte solution. The transport of electrolyte by railcar can transport approximately 100 cubic meters of electrolyte per railcar, or approximately enough electrolyte to provide 1 MW of energy for 1.5 hours.

At block 130, the shippable container is loaded with the liquid electrolyte solution. In some embodiments, the liquid electrolyte solution may include a catholyte. In some embodiments, the liquid electrolyte solution may include an anolyte. In some embodiments, the shippable container may be partitioned to transport both an anolyte and a catholyte. Examples of suitable redox couples include Iron/Chromium ($Fe^{2+}/Fe^{3+}$ and $Cr^{2+}/Cr^{3+}$) and Vanadium ($V^{2+}/V^{3+}$ and $V^{4+}/V^{5+}$).

At block 140, the shippable container containing the charged liquid electrolyte solution is transported to a discharging station. In some embodiments, the shippable container is transported using a transportation system (e.g., car, truck, rail, ship, or air). In one embodiment, the shippable container containing the charged liquid electrolyte solution is transported at least in part by railroad. In some embodiments, the discharging station includes a railroad spur. In some embodiments, an anolyte and a catholyte may be transported in separate shippable containers as part of the same shipment.

At block 150, the liquid electrolyte solution is off-loaded to the discharging station. In some embodiments, the discharging station includes an electrical substation. In some embodiments, at least some of the catholyte is added to a cathode region of an electrochemical cell. In some embodiments, at least some of the anolyte is added to an anode region of an electrochemical cell.

At block 160, the liquid electrolyte solution is discharged into a load zone at or accessible from the second discharge station. In some embodiments, the discharging liquid electrolyte solution is used to power an electrical load. In some embodiments, the discharging liquid electrolyte solution provides electricity to an electrical grid.

At block 170, the shippable container containing the discharged liquid electrolyte solution is transported to a second charging station. In some embodiments, the discharged liquid electrolyte solution may be (re)charged at the second charging station. In some embodiments, the discharged liquid electrolyte solution may be partially or completely replaced by fresh liquid electrolyte solution. The second charging station may be the same or different as the first charging station. Similarly, the second charging station may be located at the same or different location as the first charging station. That is, the shippable containers may be shuttled back and forth between the first and second locations where they can be charged, discharged, and re-charged as needed.

In some embodiments, the shippable container is transported using a transportation system (e.g., car, truck, rail, ship, and/or air). In one embodiment, the shippable container is transported at least in part by railroad. In some embodiments, the second charging station includes a railroad spur. It will be appreciated that in some embodiments, a portion of the electricity of the charged solution may be used to power the locomotive or other engine that moves the mobile containers that carry the charged electrolyte. In some embodiments, a portion of the electricity of the charged solution may be used to power the car or truck that moves the mobile containers that carry the charged electrolyte.

Figure 2:
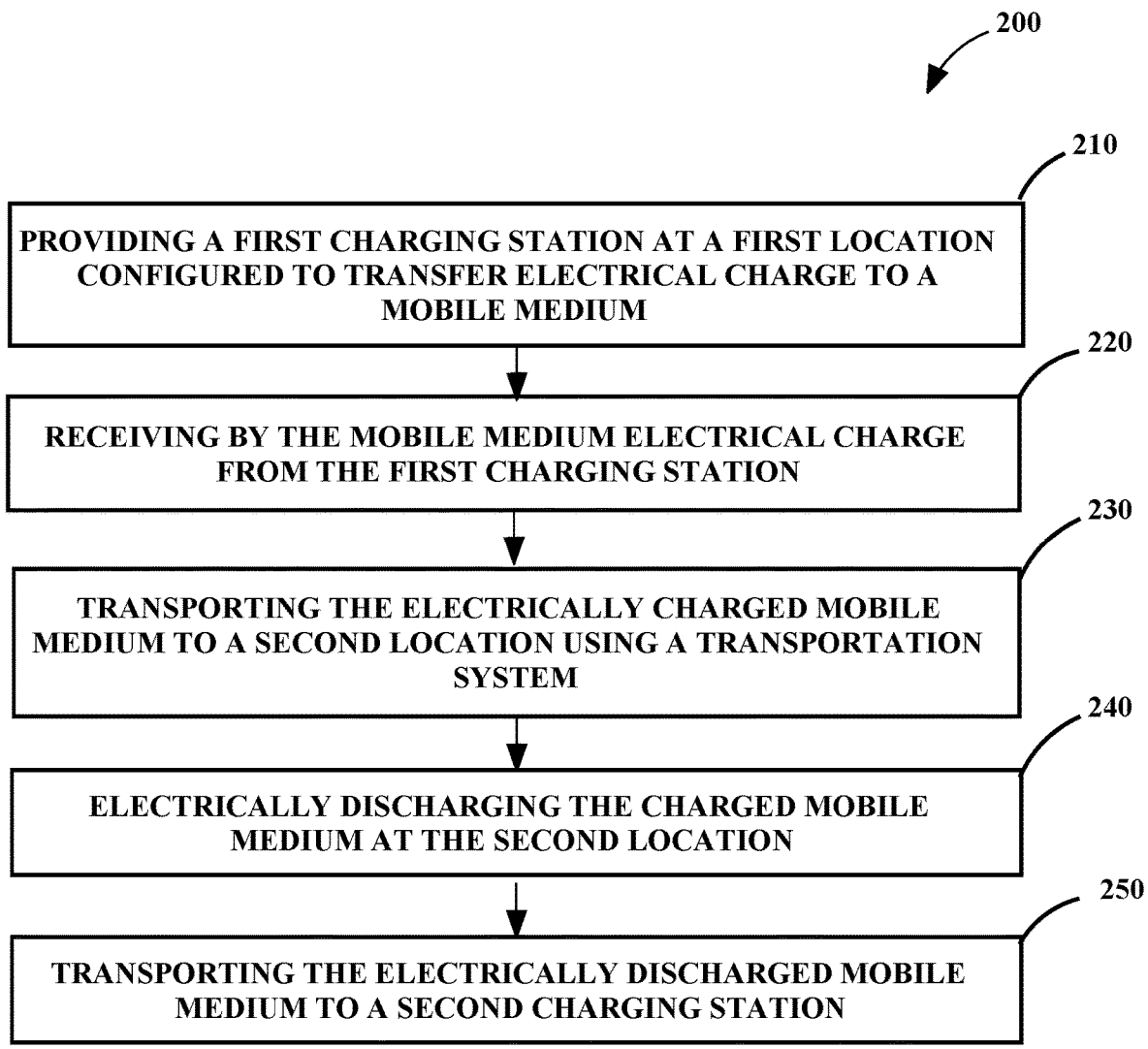
FIG. 2 is a flowchart of a method of transmitting electricity, according to an embodiment.

An embodiment of a method 200 of transmitting electricity is shown in FIG. 2. In the example of FIG. 2, at block 210, a first charging station is provided at a first location and configured to transfer electrical charge to a mobile medium. In some embodiments, the first charging station includes an electrical substation. In some embodiments, the first charging station includes an electrical generating station. In some embodiments, the electrical generating station generates at least a portion of the station output from solar and/or wind energy. In some embodiments, the first charging station includes a railroad spur.

At block 220, a mobile medium receives an electrical charge from the first charging station. In some embodiments, the mobile medium includes a liquid electrolyte solution. In some embodiments, the mobile medium includes a solid electrolyte solution.

At block 230, the electrically charged mobile medium is transported to a second location. In some embodiments, the charged mobile medium is transported using a transportation system (e.g., car, truck, rail, ship, and/or air). In one embodiment, the charged mobile medium is transported at least in part by railroad. In some embodiments, the second location includes a railroad spur.

At block 240, the electrically charged mobile medium is electrically discharged. In some embodiments, the discharging mobile medium is used to power an electrical load. In some embodiments, the discharging mobile medium supplies electricity to an electrical grid. In some embodiments, the discharging station includes an electrical substation.

Figure 8:
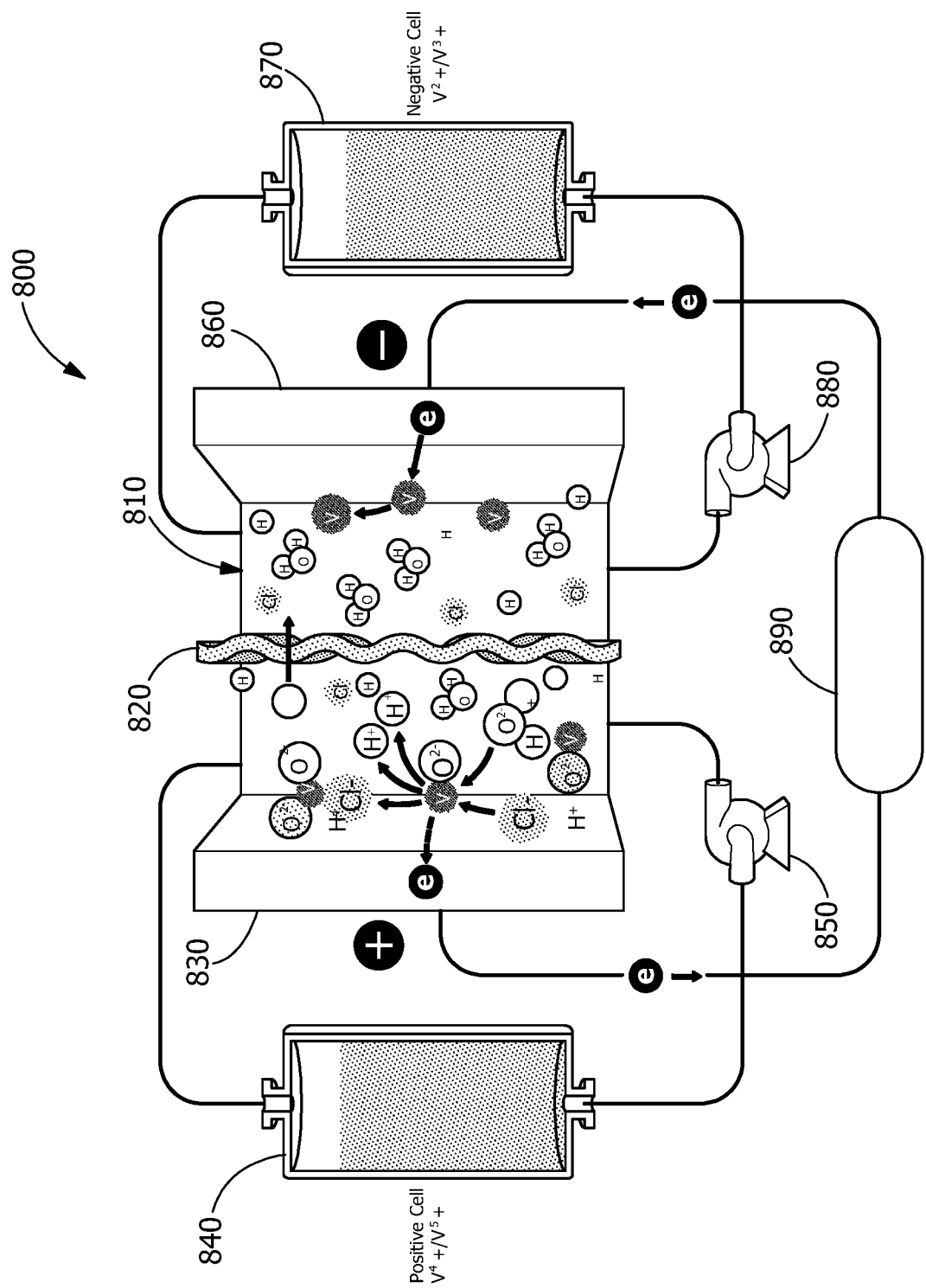
FIG. 8 is a schematic diagram of an electrochemical cell, according to an embodiment.

At block 250, the electrically discharged mobile medium is transported to a second charging station. In some embodiments, the discharged mobile medium may be charged at the second charging station. In some embodiments, the discharged mobile medium may be partially or completely replaced by fresh electrolyte solution. The second charging station may be the same as or different from the first charging station. The second charging station may be located at the same or different location as the first charging station. In some embodiments, the discharged mobile medium is transported using a transportation system (e.g., car, truck, rail, ship, and/or air). In one embodiment, the discharged mobile medium is transported at least in part by railroad. In some embodiments, the second charging station includes a railroad spur. It will be appreciated that the number of either or both the charging and discharging stations as well as the locations of and geographical relationships between charging and discharging stations may be changed to fit differing electrical dispatch requirements as the grid evolves over time or as determined by operations or customer needs. FIG. 8 is a map illustrating locational delivery, according to an embodiment.

In an embodiment, a shippable discharging station including an electrolyte solution is charged (e.g., oxidized or reduced) to carry electrical energy. The discharging station can then be transported using a transportation system (e.g., car, truck, rail, ship, and/or air) to deliver the electrical energy to a remote location where and when needed. In one embodiment, the discharging station is transported by rail. In one embodiment, the discharging station is transported by truck. In some embodiments, the shippable discharging station may include various connection means in order to allow the electrical energy to be discharged into a load zone or power grid. In some embodiments, the connection means may include physical connection means such as plugs, cables, and/or bus bars. In some embodiments, the connection means may provide the ability to connect to a communication network, authenticate secure access to a grid or load zone, regulate the power provided to the load, and/or communicate with a remote monitoring system.

It will be appreciated that any means for bulk transfer of electrical energy in a container from one location to another without the use of a wired network and that can be charged at the first location and later discharged into a load zone at or accessible from a second location may be employed. Suitable examples include, but are not limited to, solid electrolytes, lithium ion cells, sodium ion cells, sulfur containing electrolytes, and the like.

The electricity in the shippable discharging station may be discharged as needed. In some embodiments, the shippable discharging station may be charged at a first location and discharged at a second, different location. In an embodiment, the discharging may be performed at a location not served by an electrical grid. In another embodiment, the discharging may be performed at a location to augment an existing electrical grid. In a further embodiment, the discharging may be configured to provide power in excess of the capacity of an existing electrical grid.

Figure 3:
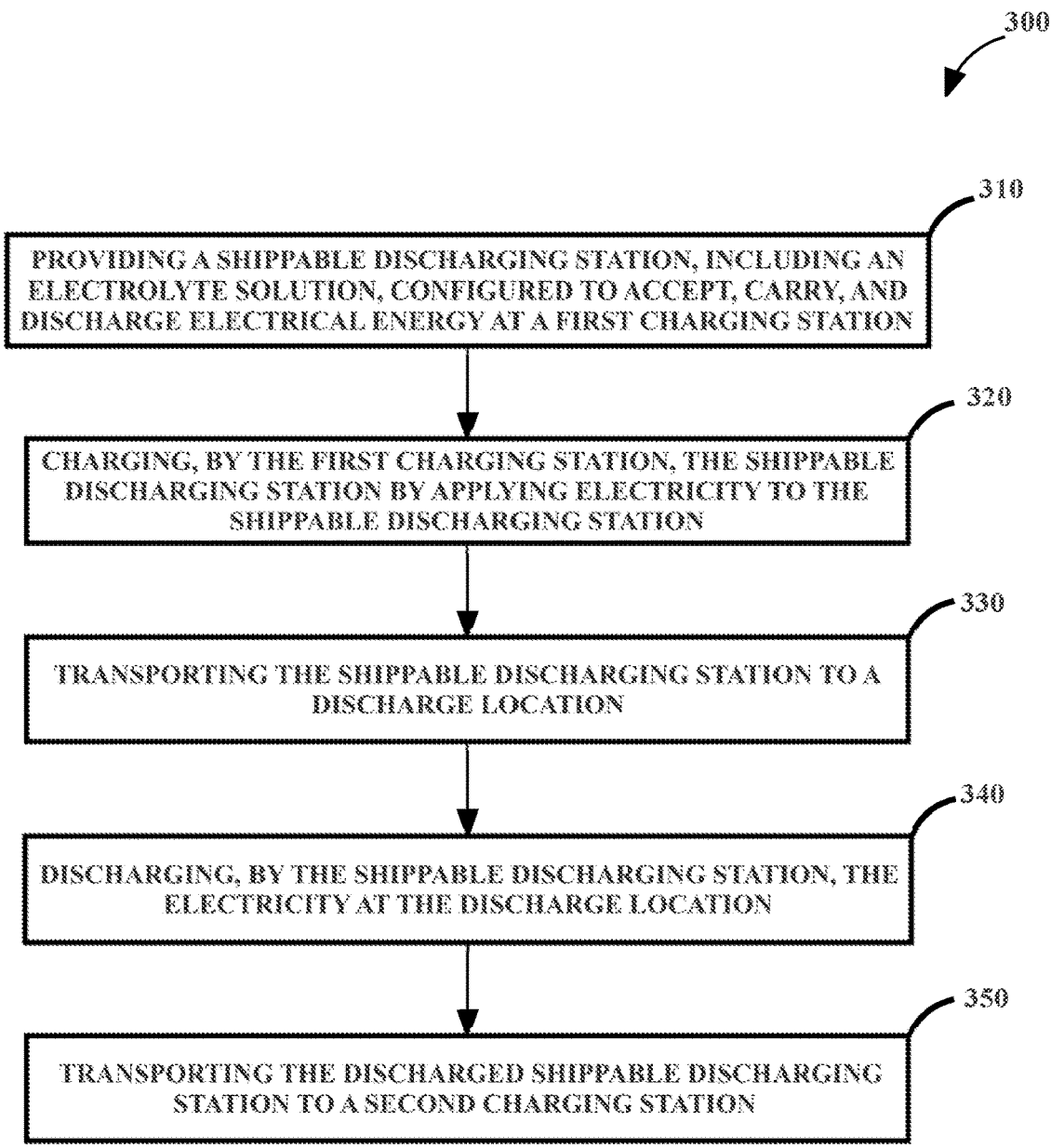
FIG. 3 is a flowchart of a method of transmitting electricity, according to an embodiment.

An embodiment of a method 300 of transmitting electricity is shown in FIG. 3. In the example of FIG. 3, at block 310, a shippable discharging station including an electrolyte solution configured to accept, carry, and discharge electrical energy is provided at a first charging station. In some embodiments, the shippable discharging station may include both an anolyte and a catholyte. Examples of suitable redox couples include Iron/Chromium ($Fe^{2+}/Fe^{3+}$ and $Cr^{2+}/Cr^{3+}$), Zinc/Bromine ($Zn^{1+}/Zn^{2+}$ and $Br_2/2Br^{1-}$), and Vanadium ($V^{2+}/V^{3+}$ and $V^{4+}/V^{5+}$). In some embodiments, the shippable discharging station may include a railroad car, truck, truck trailer, ship, or other transport means. In some embodiments, the shippable discharging station is configured to be shippable by truck or railroad. In one embodiment, the shippable discharging station includes a truck configured to transport the shippable discharging station. In some embodiments, the first charging station includes an electrical substation. In some embodiments, the first charging station includes an electrical generating station. In some embodiments, the electrical generating station generates at least a portion of the station output from solar and/or wind energy. In some embodiments, the first charging station includes a railroad spur.

At block 320, the shippable discharging station is charged by applying electricity to the shippable discharging station from the first charging station (e.g., electrical substation). The number and/or capacity of shippable discharging station may be selected to provide a predetermined amount of electrical energy at the remote site. In some presently preferred embodiments, the amount of electric energy transported for discharge into a load zone remote from the first location is greater than 3.6 Megajoules. In some cases, that may require contemporaneous transportation of multiple shippable discharging stations. In some embodiments, the amount of energy stored by the shippable discharging station may be at least about 0.1 Megawatt hour, at least about 0.5

Megawatt hour, at least about 1 Megawatt hour, at least about 2 Megawatt hour, or more.

At block 330, the shippable discharging station is transported to a discharge location. In some embodiments, the shippable discharging station is transported using a transportation system (e.g., car, truck, rail, ship, or air). In one embodiment, the shippable discharging station is transported at least in part by truck. In some embodiments, the discharging location includes an electrical substation. In some embodiments, an anolyte and a catholyte may be transported in separate shippable containers as part of the same shipment.

At block 340, the electricity is discharged by the shippable discharging station at the discharge location. In some embodiments, the shippable discharging station may be discharged into a load zone or an electrical load. In some embodiments, the discharge location includes an electrical substation. In some embodiments, the shippable discharging station provides electricity to an electrical grid.

At block 350, the discharged shippable discharging station is transported to a second charging station. In some embodiments, the discharged shippable discharging station may be (re)charged at the second charging station. In some embodiments, the discharged shippable discharging station may be partially or completely charged, for example, by replacing the electrolyte solution with fresh (charged) electrolyte solution. The second charging station may be the same or different as the first charging station. Similarly, the second charging station may be located at the same or different location as the first charging station. That is, the shippable discharging station may be shuttled back and forth between the first and second locations where it can be charged, discharged, and re-charged as needed.

In some embodiments, the shippable discharging station is transported using a transportation system (e.g., car, truck, rail, ship, and/or air). In one embodiment, the shippable discharging station is transported at least in part by truck or railroad. In some embodiments, the discharge location includes a railroad spur. It will be appreciated that in some embodiments, a portion of the electricity of the shippable discharging station may be used to power the truck or other transportation means that moves the shippable discharging station.

In some embodiments, the discharge station may be essentially continuously operated while charged sources of electrical energy; (e.g., electrolyte, lithium, or the like) are sequentially connected to the shippable discharging station to provide an essentially continuous supply of electrical energy.

It will be appreciated that the number of either or both the charging and shippable discharging station as well as the locations of and geographical relationships between charging and discharge location may be changed to fit differing electrical dispatch requirements as the grid evolves over time or as determined by operations or customer needs.

A user could either connect the discharging station directly to a customer's location or request an interconnection into an Independent System Operator's (ISO) electrical grid. Alternatively, a user could respond to a public request by the ISO for solutions to grid congestion and offer the method and systems described herein as the most economical and/or timely solution.

An example of the response to a public request might be: The ISO (a regional ISO such as PJM) may conduct an "Open Access Window" requesting offers or solutions to solve for transmission grid congestion. Where one of these points of congestion is adjacent to an existing railway or other transportation network that can be used to connect a generator to this area, exemplary embodiments can be effectively used.

When connecting to an electrical grid, the shippable discharging station may need to synchronize the discharging electricity with electricity flowing through the grid from other sources. The shippable discharging station may include circuitry to provide impedance matching, phase matching, frequency matching, and/or voltage matching in order to synchronize the electrical signals. In some embodiments, the discharging station further includes circuitry to detect and analyze the electrical signal already present within the grid. In some embodiment, the circuitry will provide the electricity to the grid in accordance with IEEE 1547.

The emergence of "Smart Grid" technology allows for the management of the distribution of electricity. In order to communicate with and connect to a "Smart Grid" the shippable discharging station may include circuitry that can communicate with a management unit of the "Smart Grid". The shippable discharging station may communicate with the management unit via, for example, the internet, wired or wireless telephone, or the electrical distribution system itself. In some embodiments, the shippable discharging station may include circuitry that allows the shippable discharging station to communicate with the management unit securely. In one embodiment, the communication between the shippable discharging station and the management unit is encrypted. In one embodiment, the shippable discharging station may provide authentication to the management unit to gain access to the electrical grid.

In one embodiment, the circuitry may use the measured electrical signal of the grid to calculate a synchrophasor. A first synchrophaser is a time-synchronized representation of the magnitude and phase angle of the sine waves of electrical signal. The first synchrophaser may include voltage, current, phase angle, and frequency, corresponding to the electrical signal at a grid node. The first synchrophasor may then be used by the circuitry of the shippable charging station to allow for impedance matching, phase matching, frequency matching, and/or voltage matching in order to synchronize the electrical signals.

In a further embodiment, one or more additional synchrophasors may be simultaneously determined by sampling circuitry at one or more additional grid nodes. The one or more additional grid nodes may be geographically spaced apart from the first grid node. The one or more additional synchrophasors may be time synchronized with the first synchrophasor. In some embodiments, the first synchrophasor and the one or more additional synchrophasors are time synchronized to within about 10 milliseconds, about 7 milliseconds, about 5 milliseconds, about 3 milliseconds, about 2 milliseconds, and/or about 1 milliseconds.

The first synchrophasor and additional synchrophasors may be communicated to a management unit via a local network and/or the internet. The management unit may be geographically spaced apart from the shippable discharging station. Alternatively, the management unit may be integral to the shippable charging station.

The synchrophasor data may be transferred to the management unit via various data protocols including User Datagram Protocol (UDP), or Transmission Control Protocol (TCP) over the Internet in combination with Internet Protocol (IP). In one embodiment, the data is transmitted using User Datagram Protocol (UDP). The data may optionally be encrypted for data security.

The management unit may than communicate with the shippable discharging station to regulate the rate of discharge of electricity by the shippable discharging station to the electrical grid. In one embodiment, the discharge of electricity may be regulated to provide load balancing to the electrical grid. In another embodiment, the discharge of electricity may be regulated to improve the grid stability.

In one embodiment, the discharge of electricity may be managed by a management unit including a processor and a memory, one or more shippable discharging stations, one or more sensors coupled to an electrical grid and configured to measure at least one characteristic of the electrical grid, and one or more sensors coupled to the one or more shippable discharging stations and configured to measure at least one characteristic of the one or more shippable discharging stations. The management unit receives one or more characteristics from a first grid node from one or more grid sensors at a first time and determines a power output requirement based on the one or more characteristics from the first grid node. The management unit then regulates the operation of the one or more shippable discharging stations, based on the power output requirement.

The management unit may additionally receive one or more characteristics from a second grid node from one or more grid sensors at a second time. The management unit may determine the power output requirement based on both the one or more characteristics from the first grid node and the one or more characteristics from the second grid node. In some embodiments, the first time and the second time may be substantially the same. In some embodiments, the first time and the second time may be within about 10 milliseconds, about 7 milliseconds, about 5 milliseconds, about 3 milliseconds, about 2 milliseconds, and/or about 1 milliseconds of each other.

During the discharge of electricity by the shippable discharging station, the electricity may be provided as direct current (DC) or alternating current (AC). In some embodiments, the shippable discharging station may include circuitry to convert DC current to AC current and/or AC current to DC current. In one embodiment, the shippable discharging station provides DC current to circuitry that converts the DC current to AC current prior to providing the electricity to a load zone or an electrical load.

Figure 4:
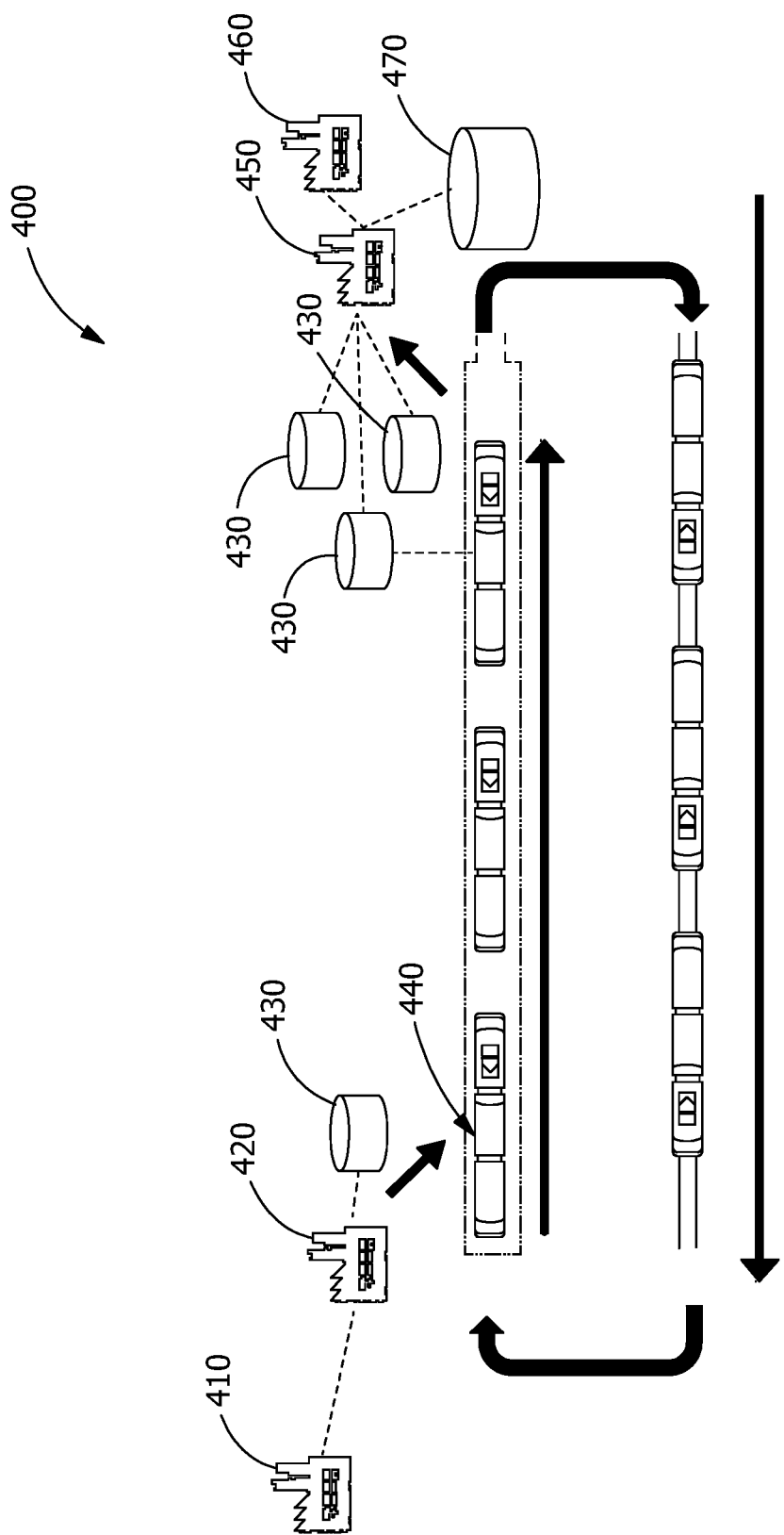
FIG. 4 is a schematic diagram of a system of transmitting electricity, according an embodiment.
Figure 5:
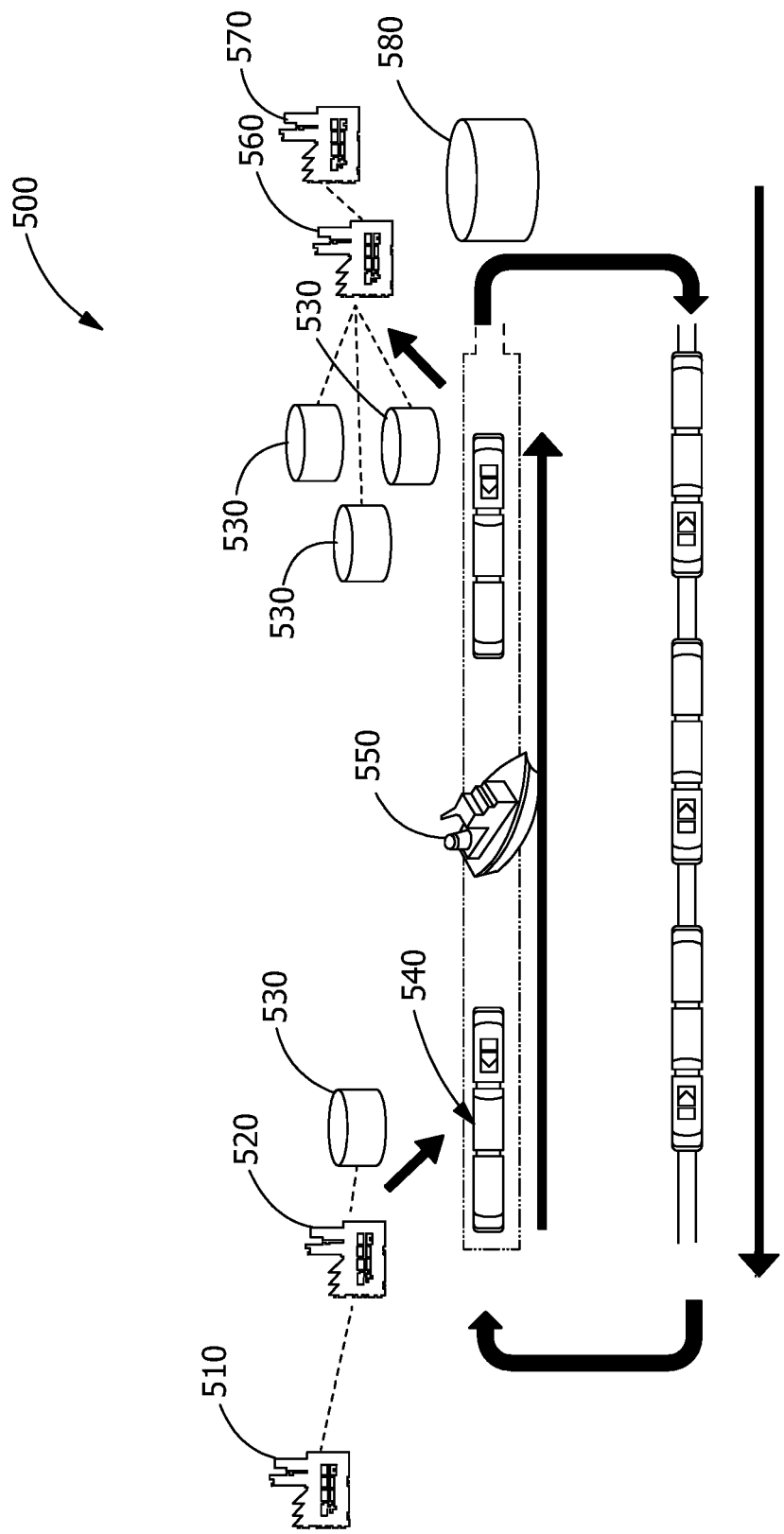
FIG. 5 is a schematic diagram of a system of transmitting electricity, according an embodiment.

FIGS. 4 and 5 schematically illustrate systems of transmitting electricity in accordance with embodiments described herein. In the example of FIG. 4, a system of electrical transmission 400 provides electricity from a first electrical substation 410 to a charging station 420 configured to charge an electrolyte solution to form a charged electrolyte solution 430, which may be stored in one or more tanks. The charged electrolyte solution 430 is transported, at least in part, by railcar 440 to a discharging station 450 configured to receive the charged electrolyte solution 430, which may be off loaded to a storage tank or pumped directly from the railcar to the discharging station 450, and electrically discharge the charged electrolyte solution 430 to provide electricity to a second electrical substation or load 460. The discharged electrolyte solution 470 is collected and may be transported, at least in part, by railcar 440 to a charging station 420. The charging station 420 may subsequently recharge all or part of the discharged electrolyte solution 470.

In the example of FIG. 5, a system of electrical transmission 500 provides electricity from a first electrical substation 510 to a charging station 520 configured to charge an electrolyte solution to form a charged electrolyte solution 530. The charged electrolyte solution 530 is transported, at least in part, by railcar 540 and at least in part by a ship 550 to a discharging station 560 configured to receive the charged electrolyte solution 530 and discharge the charged electrolyte solution 530 to provide electricity to a second electrical substation or load 570. The discharged electrolyte solution 580 is collected and may be transported, at least in part, by railcar 540 and/or ship 550 to a charging station 520. The charging station 520 may subsequently recharge all or part of the discharged electrolyte solution 580.

Figure 6:
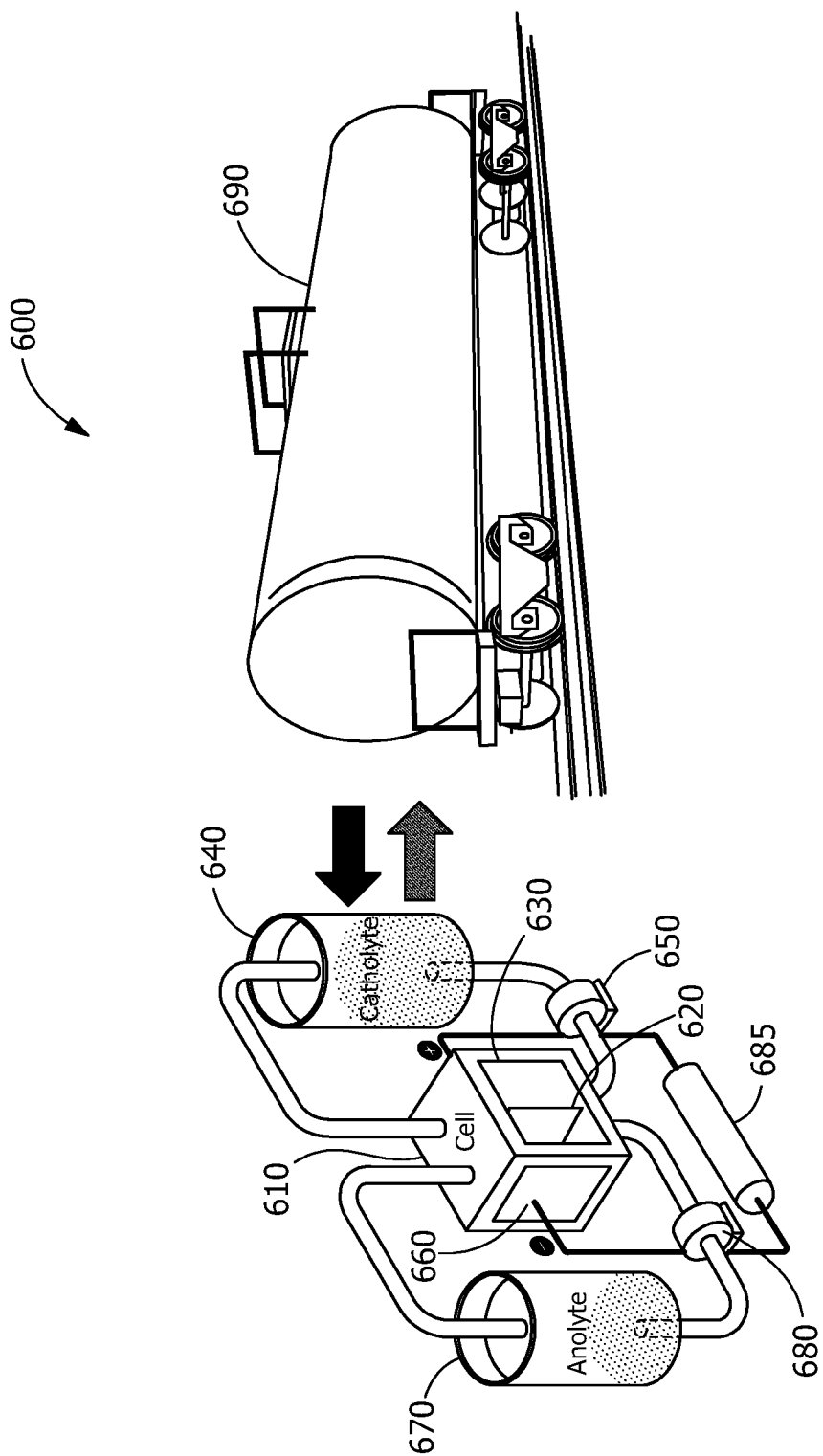
FIG. 6 is a diagram of a discharging station, according to an embodiment.

FIG. 6 is a conceptual illustration of the principles of a charging or discharging station 600, according to an embodiment, depending on the flow of electricity. In the example of FIG. 6, one or more electrochemical cells 610 having a separator membrane 620 which partitions the electrochemical cell 610. A cathode 630 surrounded by catholyte 640 is provided on one side of the separator membrane 620. The catholyte 640 may be periodically or continuously refreshed within the cell 610 by a catholyte circulation pump 650. The cathode 630 is in electrical communication with an anode 660 surrounded by anolyte 670 on an opposing side of the separator membrane 620. The anolyte 670 may be periodically or continuously refreshed within the cell 610 by an anolyte circulation pump 680. The flow of electricity may be directed through an electrical load 685. A catholyte 640 source, such as, a railcar 690 containing catholyte may be connected to the charging or discharging station 600 to supply and/or refresh the catholyte 640 of the charging or discharging station 600. It would be appreciated that one or more railcars 690 may supply charged or discharged catholyte 640 to the charging or discharging station 600 while one or more railcars 690 may receive charged or discharged catholyte 640 from the charging or discharging station 600. In some embodiments, the discharging station 600 may be transported on a railcar.

Figure 7:
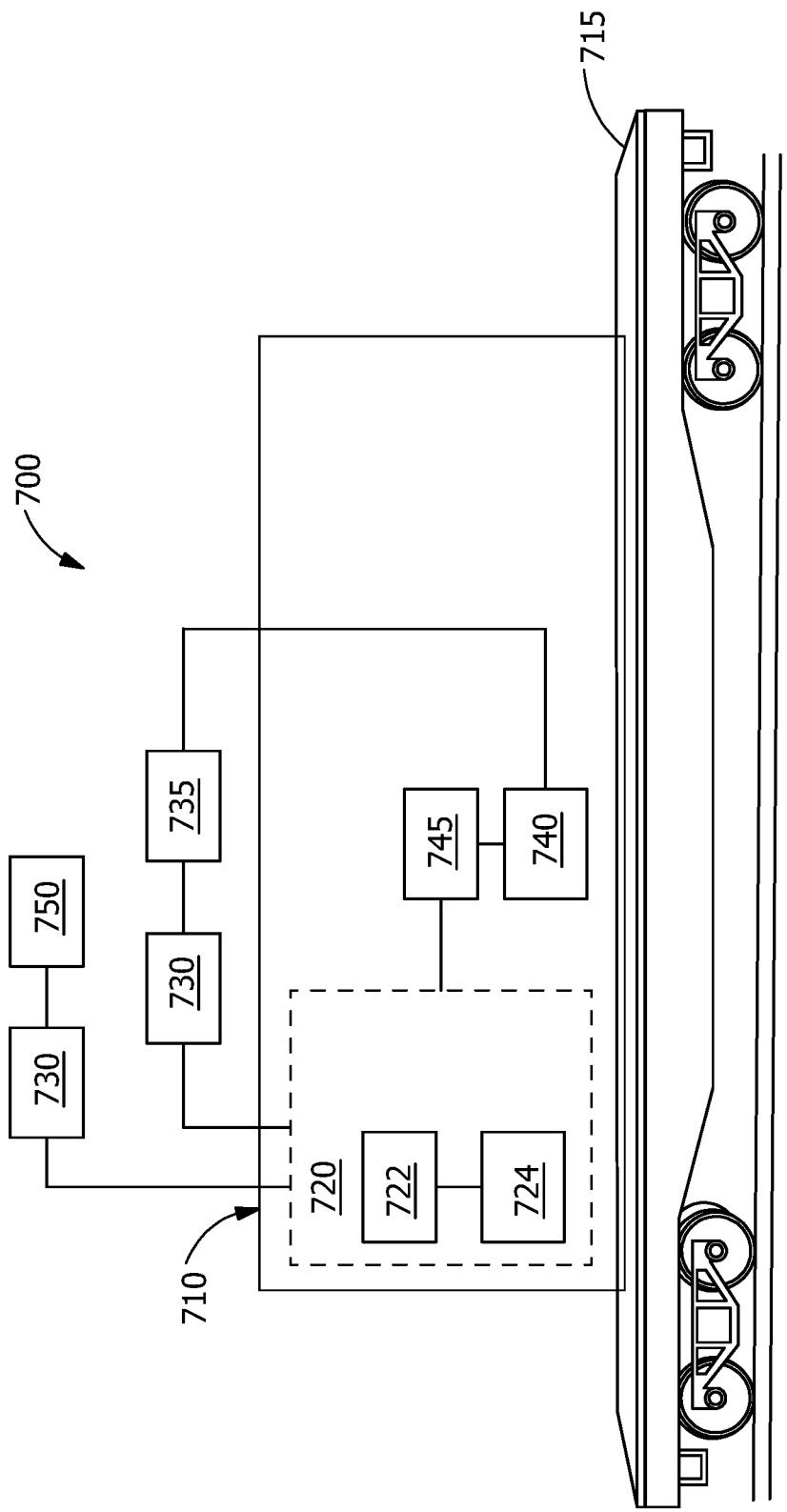
FIG. 7 is a diagram of a shippable discharging station according to an embodiment.

In an alternate embodiment, a system of electrical transmission 700 may include a shippable discharging station 710 which may be integral to a railcar 715, as shown in FIG. 7. In one embodiment, the discharge of electricity may be managed by a management unit 720 including a processor 722 and a memory 724. The management unit 720 receives at least one characteristic of an electrical grid from one or more grid sensors 730 coupled to a first grid node 735 and configured to measure at least one characteristic of the first grid node 735. The management unit 720 also receives at least one characteristic of an electrochemical cell 740 from one or more cell sensors 745 coupled to the electrochemical cell 740 and configured to measure at least one characteristic of the electrochemical cell 740. The management unit 720 receives one or more characteristics from a first grid node 735 from one or more grid sensors 730 at a first time and determines a power output requirement based on the one or more characteristics from the first grid node 735. The management unit 720 then regulates the operation of the one or more shippable discharging stations 710 to cause the electrochemical cell 740 to discharge electricity into the electrical grid, based on the power output requirement. In one embodiment, the electrical energy enters the electrical grid at the first grid node 735. The management unit may additionally receive one or more characteristics from a second grid node 750 from one or more grid sensors 730 at a second time. The management unit 720 may determine the power output requirement based on both the one or more characteristics from the first grid node 735 and the one or more characteristics from the second grid node 750. The first grid node 735 and the second grid node 750 are typically spaced apart. In some embodiments, the first time and the second time may be substantially the same. In some embodiments, the first time and the second time may be within about 10 milliseconds, about 7 milliseconds, about 5 milliseconds, about 3 milliseconds, about 2 milliseconds, and/or about 1 milliseconds of each other. In one embodiment, the shippable discharging station 710 may include the charging or discharging station 600.

In some embodiments, the discharge station is operated essentially continuously. In an embodiment, multiple shippable containers of electrolyte solution are simultaneously connected to the discharge station and configured to provide an essentially continuous supply of charged electrolyte to the discharge station while simultaneously receiving discharged electrolyte from the discharge station. For example, the discharge station may be essentially continuously operated while railcars are sequentially connected to the system to provide an essentially continuous supply of fresh electrolyte. Railcars may also be sequentially connected to the system to essentially continuously receive discharged electrolyte. In some embodiments, the discharged electrolyte may be further transported to a remote charging station.

FIG. 8 schematically illustrates the release of electricity at a discharge station 800. In the example of FIG. 8, an electrochemical cell 810 includes an ion-selective membrane 820. A cathode 830 and catholyte 840 is present on one side of the separator membrane 820. A catholyte circulation pump 850 may periodically or continuously circulate catholyte 840 to the electrochemical cell 810. Similarly, an anode 860 and anolyte 870 is present on an opposing side of the separator membrane 820. An anolyte circulation pump 880 may periodically or continuously circulate anolyte 870 to the electrochemical cell 810. The cathode 830 and anode 860 are electrically connected via a power source or load 890.

Figure 9:
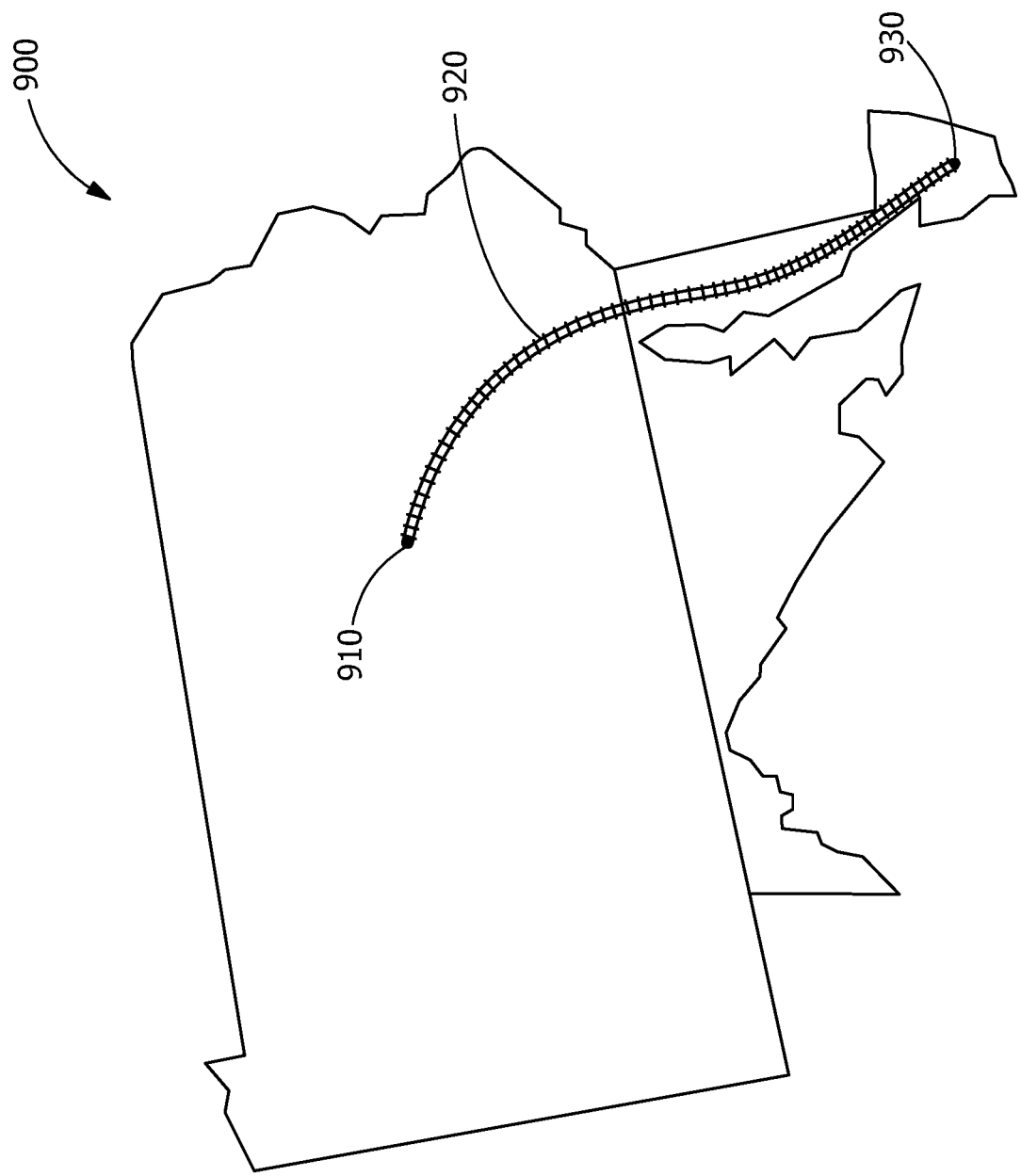
FIG. 9 is a map illustrating locational delivery, according to an embodiment.

FIG. 9 is an example of locational delivery of electrical transmission by rail. In the example of FIG. 9 a regional map 900 is provided showing one or more electrolyte charging stations 910 which provide charged electrolyte which can be transport via rail lines 920 to one or more electrical discharging stations 930.

Figure 10:
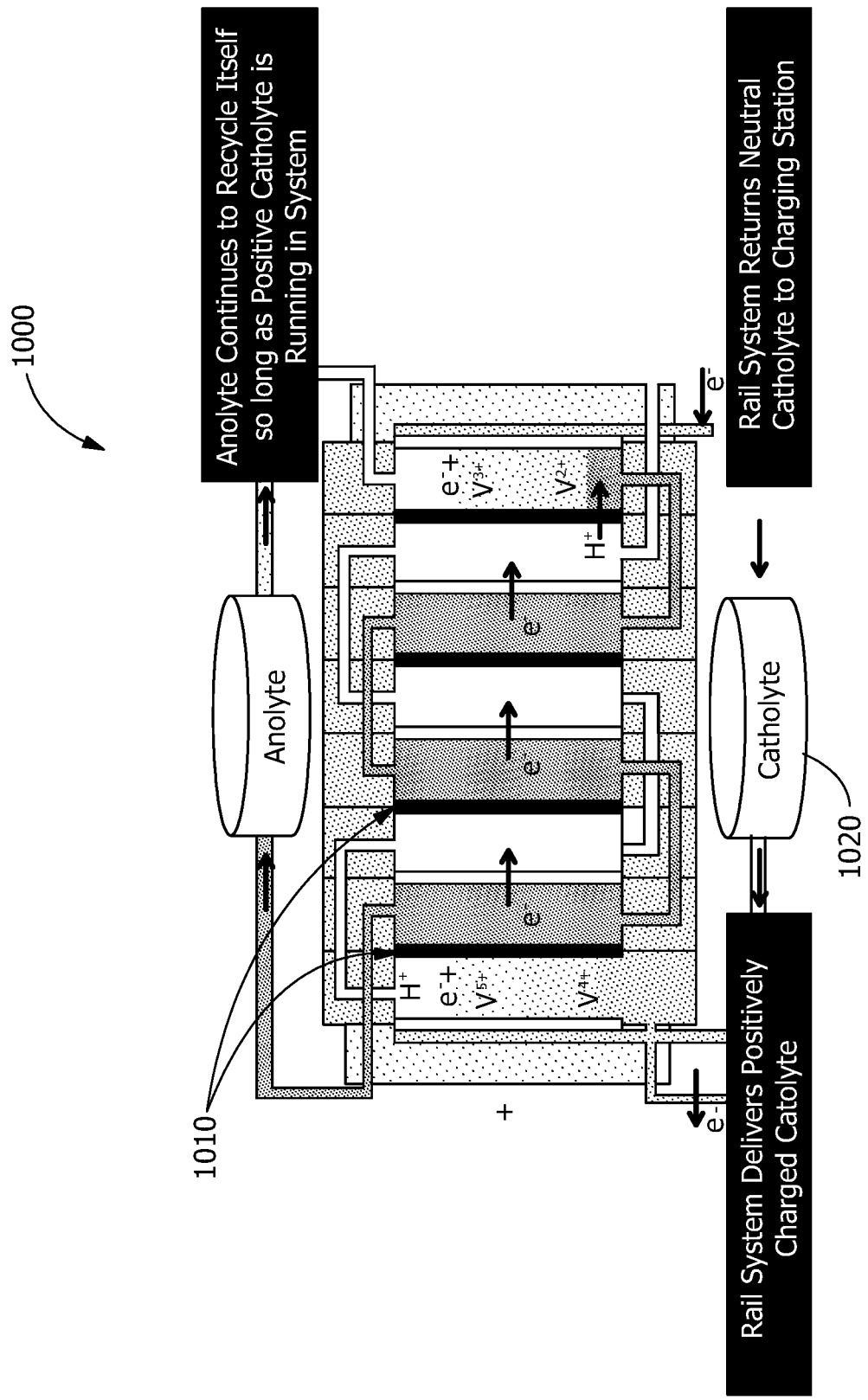
FIG. 10 is a schematic diagram of an electrochemical cell, according to an embodiment.

FIG. 10 is a schematic diagram of an electrochemical device 1000. The electrochemical device 1000 includes a plurality of electrochemical cells 1010 which are electrically connected. The electrochemical cells 1010 are additionally materially interconnected to allow anolyte to be collectively shared between the electrochemical cells 1010. The electrochemical cells 1010 are also materially connected to allow catholyte to collectively shared between the electrochemical cells 1010. Catholyte supply 1020 supplies the electrochemical cells 1010 with charged catholyte while receiving discharged (neutral) catholyte from the electrochemical cells 1010. The catholyte supply 1020 may itself be supplied with catholyte via for example a rail link.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A method of transmitting electricity, comprising:
transporting, via a shippable container, a liquid electrolyte solution to a first charging station, the first charging station configured to apply electricity to the liquid electrolyte solution;
charging the liquid electrolyte solution by applying electricity from the first charging station;
loading the charged liquid electrolyte solution into the shippable container;
transporting the shippable container containing the charged liquid electrolyte solution to a discharging station, the discharging station being at a location different than the first charging station;
discharging the charged liquid electrolyte solution; and
transporting the shippable container containing the discharged liquid electrolyte solution to a second charging station.

2. The method of claim 1, wherein the first charging station includes an electrical substation.

3. The method of claim 1, wherein the shippable container includes a railroad tank car.

4. The method of claim 1, wherein the discharging station includes an electrical sub station.

5. The method of claim 1, wherein the second charging station is the same as the first charging station.

6. The method of claim 1, wherein the second charging station is different from the first charging station.

7. The method of claim 6, wherein the second charging station is at a location different from the first charging station and wherein the second charging station is across state lines relative to the first charging station.

8. The method of claim 1, wherein the second charging station includes an electrical substation.

9. The method of claim 1, wherein transporting the shippable container includes transporting the shippable container by railroad.

10. The method of claim 1, wherein the charged liquid electrolyte solution is discharged into an electrical grid.

11. A method of transmitting electricity, comprising:
transferring electrical charge to a mobile medium provided at a first charging station at a first location;
receiving by the mobile medium electrical charge from the first charging station;
transporting the charged mobile medium to a second location, the second location being different than the first location; and
discharging the charged mobile medium into a desired load zone accessible from the second location.

12. The method of claim 11, wherein the mobile medium is transported to the second location in a different state from the first location.

13. The method of claim 11, comprising contemporaneously transporting one or more mobile mediums containing at least 33 kV of electric potential from the first location to the second location.

14. The method of claim 11, further comprising transporting the discharged mobile medium to a second charging station.

15. The method of claim 11, wherein the mobile medium includes a liquid electrolyte solution.

16. The method of claim 11, wherein the first charging station is in electrical communication with an electrical grid.

17. The method of claim 11, wherein the first charging station includes an electrical substation.

18. A method of transmitting electricity, comprising:
receiving a shippable discharging medium including an electrolyte solution at a first charging station;
applying, by the first charging station, electrical energy to the shippable discharging medium;
transporting, the shippable discharging medium to a discharge location;
discharging, by the shippable discharging medium, electricity at the discharge location; and
transporting, the discharged shippable discharging medium to a second charging station.

19. The method of claim 18, wherein the electrolyte solution includes an oxidation/reduction couple selected from the group consisting of Iron/Chromium ($Fe^{2+}/Fe^{3+}$ and $Cr^{2+}/Cr^{3+}$), Zinc/Bromine ($Zn^{1+}/Zn^{2+}$ and $Br_2/2Br^{1-}$), and Vanadium ($V^{2+}/V^{3+}$ and $V^{4+}/V^{5+}$).

20. The method of claim 18, wherein the shippable discharging medium includes one or more of solid electrolytes, lithium ion cells, sodium ion cells, or sulfur containing electrolytes.

21. The method of claim 18, wherein the first charging station includes an electrical substation.

22. The method of claim 18, wherein discharging the shippable discharging medium provides at least 0.1 Megawatt hour of power.

23. The method of claim 18, wherein the transporting of the shippable discharging medium includes shipment by truck.

24. The method of claim 18, wherein the discharging of the shippable discharging medium provides electricity to an electrical grid.

25. The method of claim 24 further comprising:
synchronizing, by the shippable discharging medium, the discharging electricity with an electrical signal present in the electrical grid.

26. The method of claim 25, wherein the synchronizing includes impedance matching.

27. The method of claim 25, wherein the synchronizing includes phase matching.

28. The method of claim 18 further comprising:
communicating, by the shippable discharging medium, with a management unit of an electrical grid.

29. The method of claim 28, wherein the communicating includes encryption.

30. The method of claim 28, wherein the communicating includes authentication.

* * * * *